United States Patent [19]

Venkateswar

[11] Patent Number: 5,719,682
[45] Date of Patent: Feb. 17, 1998

[54] METHOD OF IMPROVED PRINTING USING A SPATIAL LIGHT MODULATOR

[75] Inventor: Vadlamannati Venkateswar, Plano, Tex.

[73] Assignee: Texas Instruments Incorporated, Dallas, Tex.

[21] Appl. No.: 779,867

[22] Filed: Jan. 7, 1997

Related U.S. Application Data

[62] Division of Ser. No. 493,444, Jun. 22, 1995.
[51] Int. Cl.$^6$ .............................. H04N 1/40; H04N 1/23; G01D 9/42
[52] U.S. Cl. ........................ 358/298; 358/300; 358/455; 347/239
[58] Field of Search .................................. 358/298, 296, 358/300, 455, 456; 347/233, 239, 240; 399/177, 196–202

[56] References Cited

U.S. PATENT DOCUMENTS

| | | |
|---|---|---|
| 5,453,778 | 9/1995 | Venkateswar et al. ............... 347/239 |
| 5,459,492 | 10/1995 | Venkateswar ........................ 347/253 |
| 5,461,411 | 10/1995 | Florence et al. ..................... 347/240 |
| 5,493,322 | 2/1996 | Ng et al. .............................. 347/240 |
| 5,510,824 | 4/1996 | Nelson ................................. 347/239 |
| 5,614,937 | 3/1997 | Nelson ................................. 347/240 |

*Primary Examiner*—Eric Frahm
*Attorney, Agent, or Firm*—Julie L. Reed; James C. Kesterson; Richard L. Donaldson

[57] ABSTRACT

A method for printing grayscale images that compensates for problems in the printing process. The presence of a defective element on a spatial light modulator (12) is compensated for with use of a white balancing area. If a column of the modulator (12) has an element stuck ON, a corresponding element in the same column in the white balancing area is turned OFF while all other columns have elements that are ON. If the illumination is non-uniform, the exposure values of each element are multiplied by an efficiency factor which compensates for the non-uniformity.

2 Claims, 8 Drawing Sheets

SLIDING WINDOW ARRAY FOR
ROW INTEGRATION

ROW 0      [0,0,0,···0,0]
ROW 1      [0,0,0,···0,0]
ROW 2      [0,0,0,···0,0]
⋮
ROW R-1   [9,6,2,···0,7]

| GRAYLEVEL | NUMBER OF EXPOSURES |
|---|---|
| 0 | 0 |
| 1 | 1 |
| 2 | 2 |
| 3 | 3 |
| 4 | 5 |
| 5 | 6 |
| 6 | 7 |
| 7 | 9 |

MICROIMAGE

ROW 0      [0,0,0,···0,0]
ROW 1      [0,0,0,···0,0]
ROW 2      [0,0,0,···0,0]
⋮
ROW R-1   [1,1,1,···0,1]

ROW INTEGRATION
SLIDING WINDOW ARRAY AFTER DECREMENTING AND SLIDING

ROW 1     [0,0,0, · · · 0,0]
ROW 2     [0,0,0, · · · 0,0]
·
·
·
ROW R-2 [8,5,1, · · · 0,6]
ROW R-1 [5,0,3, · · · 4,6]

FIG. 7

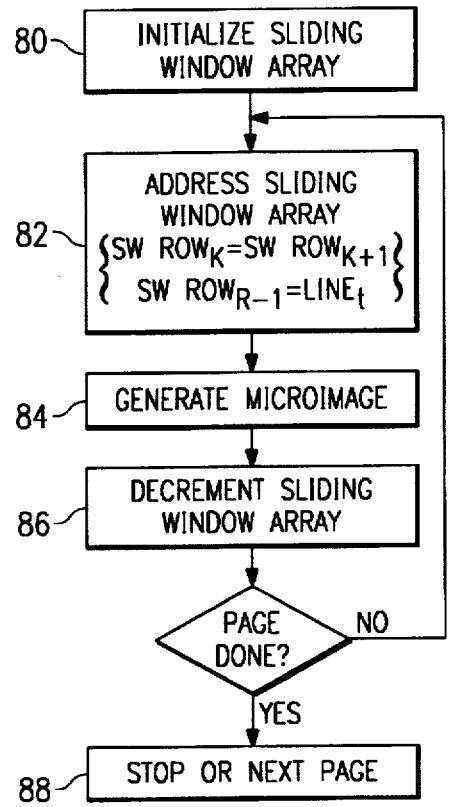

FIG. 8

SLIDING WINDOW ARRAY FOR MULTIPLE INTENSITIES $$SW\ ROW\ 0 \left\{ \begin{bmatrix} I1=0 \\ I2=0 \\ I4=0 \\ I8=0 \end{bmatrix} \begin{bmatrix} I1=0 \\ I2=0 \\ I4=0 \\ I8=0 \end{bmatrix} \cdots \begin{bmatrix} I1=0 \\ I2=0 \\ I4=0 \\ I8=0 \end{bmatrix} \right\}$$

·
·
·

$$SW\ ROW\ R-1 \left\{ \begin{bmatrix} I1=0 \\ I2=1 \\ I4=0 \\ I8=0 \end{bmatrix} \begin{bmatrix} I1=3 \\ I2=2 \\ I4=2 \\ I8=2 \end{bmatrix} \cdots \begin{bmatrix} I1=5 \\ I2=5 \\ I4=4 \\ I8=4 \end{bmatrix} \right\}$$

FIG. 10

| GRAYLEVEL | NUMBER OF EXPOSURES | | | |
|---|---|---|---|---|
| | I1 | I2 | I4 | I8 |
| 0 | 0 | 0 | 0 | 0 |
| 1 | 1 | 0 | 0 | 0 |
| 2 | 0 | 1 | 0 | 0 |
| .. | | | | |
| 31 | 3 | 2 | 2 | 2 |
| .. | | | | |
| 63 | 5 | 5 | 4 | 4 |

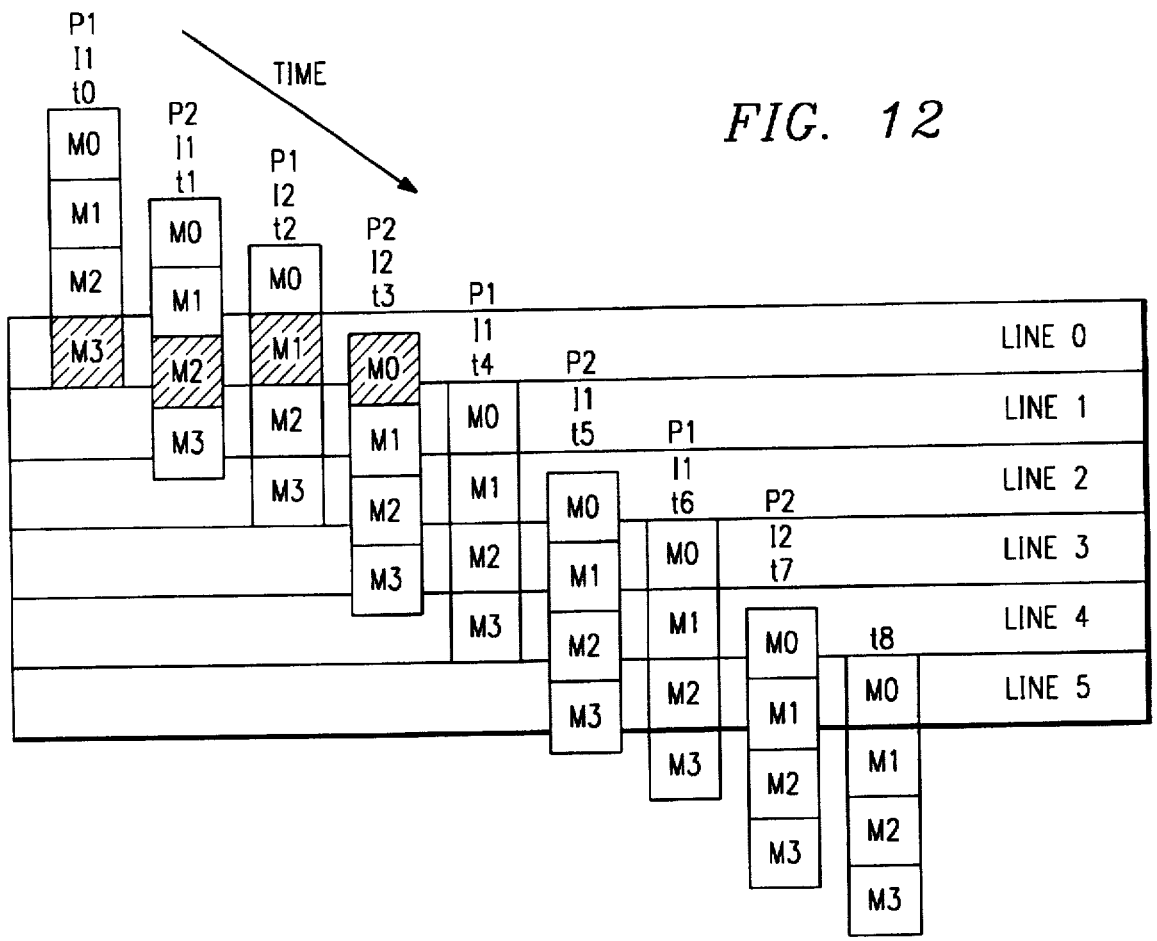

FIG. 12

SLIDING WINDOW ARRAY FOR MULTIPLE PHASES AND INTENSITIES $$\text{ROW 0} \left\{ \begin{bmatrix} P1 & P2 \\ I1=0 & I1=0 \\ I2=0, & I2=0 \end{bmatrix} \begin{bmatrix} P1 & P2 \\ I1=0 & I1=0 \\ I2=0, & I2=0 \end{bmatrix}, \cdots \begin{bmatrix} P1 & P2 \\ I1=0 & I1=0 \\ I2=0, & I2=0 \end{bmatrix} \right\}$$

$$\vdots$$

$$\text{ROW R-1} \left\{ \begin{bmatrix} P1 & P2 \\ I1=0 & I1=0 \\ I2=1, & I2=0 \end{bmatrix} \begin{bmatrix} P1 & P2 \\ I1=11 & I1=0 \\ I2=10, & I2=0 \end{bmatrix}, \cdots \begin{bmatrix} P1 & P2 \\ I1=11 & I1=11 \\ I2=10, & I2=11 \end{bmatrix} \right\}$$

FIG. 13

| GRAYLEVEL | NUMBER OF EXPOSURES | | | |
|---|---|---|---|---|
| | I1, P1 | I1, P2 | I2, P1 | I2, P2 |
| 0 | 0 | 0 | 0 | 0 |
| 1 | 1 | 0 | 0 | 0 |
| ... | ... | | | |
| 15 | 5 | 0 | 5 | 0 |
| 16 | 5 | 1 | 5 | 0 |
| .. | .. | | | |
| 30 | 5 | 5 | 5 | 5 |
| 31 | 5 | 6 | 5 | 5 |

FIG. 16

| GRAYLEVEL | NUMBER OF EXPOSURES | | | | | | | |
|---|---|---|---|---|---|---|---|---|
| | I1, P1 | I1, P2 | I1, P3 | I1, P4 | I2, P1 | I2, P2 | I2, P3 | I2, P4 |
| 0 | 0 | 0 | 0 | 0 | 0 | 0 | 0 | 0 |
| 1 | 1 | 0 | 0 | 0 | 0 | 0 | 0 | 0 |
| 2 | 0 | 0 | 0 | 0 | 1 | 0 | 0 | 0 |
| ...... | | | | | | | | |
| 15 | 5 | 0 | 0 | 0 | 5 | 0 | 0 | 0 |
| 16 | 5 | 1 | 0 | 0 | 5 | 0 | 0 | 0 |
| ... | | | | | | | | |
| 31 | 5 | 6 | 0 | 0 | 5 | 5 | 0 | 0 |
| ... | | | | | | | | |
| 63 | 5 | 6 | 6 | 6 | 5 | 5 | 5 | 5 |

FIG. 17

SLIDING WINDOW ARRAY FOR PULSE DURATION

ROW 0 $\left\{ \begin{bmatrix} D1=0 \\ D2=0 \\ D3=0 \end{bmatrix}, \begin{bmatrix} D1=0 \\ D2=0 \\ D3=0 \end{bmatrix}, \cdots \begin{bmatrix} D1=0 \\ D2=0 \\ D3=0 \end{bmatrix} \right\}$ ROW R-1 $\left\{ \begin{bmatrix} D1=3 \\ D2=2 \\ D3=2 \end{bmatrix}, \begin{bmatrix} D1=4 \\ D2=5 \\ D3=4 \end{bmatrix}, \cdots \begin{bmatrix} D1=5 \\ D2=5 \\ D3=4 \end{bmatrix} \right\}$

FIG. 18

| GRAYLEVEL | NUMBER OF EXPOSURES | | |
|---|---|---|---|
| | I1, P1 | I1, P2 | I1, P3 |
| 0 | 0 | 0 | 0 |
| 1 | 1 | 0 | 0 |
| ... | ... | | |
| 15 | 3 | 2 | 2 |
| 16 | 2 | 3 | 2 |
| .. | .. | | |
| 30 | 4 | 5 | 4 |
| 31 | 5 | 5 | 4 |

| GRAYLEVEL | NUMBER OF EXPOSURES | | | |
|---|---|---|---|---|
| | P1=25% | P2=12.5% | P3=25% | P4=12.5% |
| 0 | 0 | 0 | 0 | 0 |
| 1 | 0 | 1 | 0 | 0 |
| 2 | 1 | 0 | 0 | 0 |
| | | | | |
| 30 | 10 | 10 | 0 | 0 |
| 31 | 10 | 11 | 0 | 0 |
| 32 | 10 | 11 | 0 | 1 |
| | | | | |
| 47 | 10 | 11 | 5 | 6 |
| | | | | |
| 63 | 10 | 11 | 11 | 10 |

| GRAYLEVEL | INTENSITY LEVEL |
|---|---|
| 0 | 0 |
| 1 | 1 |
| 2 | 2 |
| ..... | |
| 15 | 15 |
| 16 | 15 |
| ... | |
| 31 | 15 |
| 32 | 15 |
| .. | |
| 63 | 15 |

METHOD OF IMPROVED PRINTING USING A SPATIAL LIGHT MODULATOR

This is a divisional of application Ser. No. 08/493,444, filed Jun. 22, 1995.

TECHNICAL FIELD OF THE INVENTION

This invention relates generally to electrophotographic printing with a spatial light modulator (SLM), and more particularly to generating grayscale images with data that represents time integration values and that is selected for delivery to the SLM with a sliding window memory.

BACKGROUND OF THE INVENTION

Spatial light modulator ("SLM") technology has found applications in many fields, a significant one of which is electrophotographic printing. In general, an SLM is an array of light-emitting, light-transmitting or light-reflecting elements, which are individually addressable, usually with electronic signals. Many SLMs are binary, having an addressing scheme that switches its elements to either to an "on" or an "off" state to form the image.

One type of SLM is a digital micro-mirror device (DMD), sometimes referred to as a deformable mirror device. The DMD has an array of hundreds or thousands of tiny tilting mirrors. To permit the mirrors to tilt, each is attached to one or more hinges mounted on support posts, and spaced by means of an air gap over underlying addressing circuitry. The addressing circuitry provides electrostatic forces, which cause each mirror to selectively tilt. For printing applications, the DMD is addressed with exposure data and in accordance with the data, light is selectively reflected or not reflected from each mirror to the printer drum.

Existing electrophotographic printer technologies make use of an organic photoconductive ("OPC") drum. Depending on the type of photoconductor used, the drum is either charged or discharged to attract toner, with the charging or discharging accomplished by reflecting light onto the drum. A page is printed by exposing the drum, array-by-array. The drum rotates in a direction known as the process direction, and overlapping arrays of data are superposed on the drum to accumulate charge (or discharge) on the drum by integration of several exposures. Thus, charge is integrated over time. The toner is then transferred to paper.

U.S. Pat. No. 5,041,851, entitled "Spatial Light Modulation Printer and Method of Operation", describes the use of a spatial light modulator for exposing the OPC drum. That patent is herein incorporated by reference.

Ideally, the amount of toner that clings to any point on the drum is a function of the level of charge (or discharge) on that point. In this ideal case, grayscale printing (generating many shades of gray) could be done simply by adjusting the charge or discharge of each point so as to control the amount of toner at each point, with the desired gray scale then being printed. However, with this approach, only a limited number of shades of gray can be achieved.

Grayscales of the kind required for high resolution imaging are produced by taking advantage of the ability of the human eye to integrate over an area. For example, a mid-level gray dot will be perceived if smaller dots of lighter and darker than mid-level gray are printed next to each other. For example, if two light gray dots of 1/600 of an inch square and two dark gray dots of 1/600 of an inch square are printed in a square, the eye will integrate the four dots and perceive a mid-gray dot of 1/300 of an inch square.

To assist in generating grayscale data, SLMs can be modulated in at least two ways: intensity modulation and spatial modulation. These techniques may be combined. These techniques are described in U.S. Pat. Ser. No. 08/038,398, entitled "Process and Architecture for Digital Micro-mirror Printer", assigned to Texas Instruments Incorporated and incorporated herein by reference. For each image to be exposed, the SLM generates a series of microimages, which permit pixel-by-pixel variations in the duration of exposure and the area exposed.

In both intensity modulation and spatial modulation, the SLM must be addressed so that it exposes each pixel at the appropriate times. A goal of SLM-based printing systems is to accomplish this addressing with a minimum of processing and memory requirements.

SUMMARY OF THE INVENTION

The present invention is related to time integration for grayscale printing with SLM-based printing systems. One aspect of the invention is a method of compensating for elements of the spatial light modulator array that are stuck in the ON position. A section of the spatial light modulator is used as a white balancing area, in which elements in the same column as the defective elements are turned OFF, while all other elements in the white balancing area are turned ON.

Another aspect of the invention is a method of compensating for non-uniform illumination of the spatial light modulator array. Exposure values for each element of the array is multiplied by an efficiency factor. The efficiency factor is calculated for each column. The resulting exposure value compensates for the non-uniform illumination.

It is an advantage of the invention in that it allows fine control of grayscale images with a spatial light modulator without increasing system cost.

BRIEF DESCRIPTION OF THE DRAWINGS

FIG. 7 is a row integration sliding window array after decrementing and sliding according to the teachings of the present invention.

FIG. 8 is a flow diagram for a sliding window approach according to the teachings of the present invention.

FIG. 10 is a multiple intensities sliding window array according to the teachings of the present invention.

FIG. 12 is a graphical representation, in time, of the relationship between lines on an OPC drum and a DMD array.

FIG. 13 is a multiple phases and intensities sliding window array according to the teachings of the present invention.

FIG. 16 is a gray scale lookup table for a two intensities, four phase system according to the teachings of the present invention.

FIG. 17 is a pulse duration sliding window array according to the teachings of the present invention.

FIG. 18 is a gray scale lookup table for a three phase pulse duration modulation system according to the teachings of the present invention.

DETAILED DESCRIPTION OF THE INVENTION

For purpose of example, the following description is in terms of printer systems whose spatial light modulators (SLMs) are digital micro-mirror devices (DMDs). However, the same concepts apply to printer systems that use other types of pixel array imaging devices. For example, a printer system having an array of liquid crystal elements instead of a DMD array could used. In the case of a DMD, the image is generated by mirror elements, but for pixel array devices in general, the terms "pixels" or "elements" are often used. The pixels of the array usually have a one-to-one correspondence with the pixels of the image, and the context of the following description indicates where this is not the case.

Figure 1:
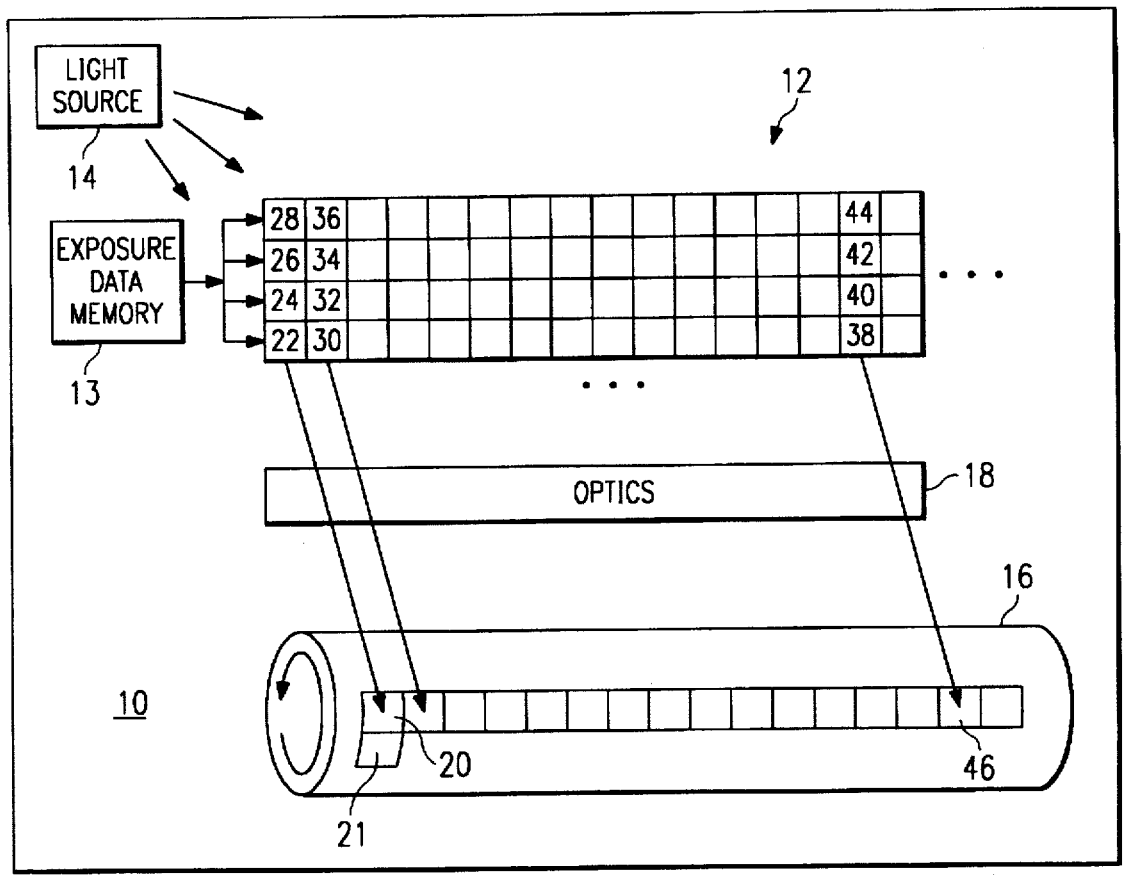
FIG. 1 illustrates the relationship between an OPC drum and a DMD array.

FIG. 1 illustrates a printer exposure unit 10 having a DMD 12 and a memory 13, in accordance with the present invention. Throughout this description, individual reflecting elements of DMD 12 are referred to as "mirrors" or "mirror elements"

Various types of these mirror elements suitable for DMD 12 are described in U.S. Pat. No. 4,662,746, entitled "Spatial Light Modulator and Method"; U.S. Pat. No. 4,956,619, entitled "Spatial Light Modulator"; U.S. Pat. No. 5,061,049, entitled "Spatial Light Modulator and Method"; U.S. Pat. No. 5,038,857, entitled "Multi-Level Deformable Mirror Device"; and U.S. Pat. Ser. No. 08/171,303, entitled "Improved Multi-Level Digital Micromirror Device." Each of these patents is assigned to Texas Instruments Incorporated, and each is incorporated herein by reference.

In the example of FIG. 1, the mirror elements of DMD 12 are vertically aligned. However, in other embodiments, each row of DMD 12 could be staggered, such that the individual mirror elements are offset from row to row. By offsetting the rows, advantage can be taken of spatial modulation in the cross-process direction, as disclosed in U.S. patent application Ser. No. 08/100,892, entitled "Method and Apparatus for Spatial Modulation in the Cross-Process Direction," which is assigned to Texas Instruments incorporated, and incorporated herein by reference.

For purposes of providing a simple example, DMD 12 has only 4 rows of mirror elements with 16 mirror elements per row. However, for practical applications, DMD 12 may have many more rows and columns. A typical DMD 12 might have 1000 or more mirror elements per row. Light from a light source 14 is reflected by DMD 12 onto an OPC drum 16, in accordance with the "on" or "off" state of each mirror element. This state is determined by data delivered from an exposure data memory 13. As explained below, memory 13 delivers one bit of data for each mirror to be addressed during a single line period.

The image is reflected and focused through an optics unit 18. As shown in FIG. 1, light from DMD 12 falls on OPC drum 16, with each mirror providing light for one pixel on the image. Only one line of pixels is explicitly illustrated, it being understood that many lines of pixels are simultaneously illuminated by DMD 12. Each pixel is either exposed or not, and thereby either charged or discharged for toner attraction. Two typical sizes for such pixels are 1/300 of an inch square and 1/600 of an inch square, although other sizes are within the scope of the present invention. The drum 16 will then rotate over the paper to be printed and the toner will be transferred from the drum 16 and fused to the paper, the line of pixels printing a line on the paper.

Because drum 16 is rotating, light is received at a line of pixels on drum 16 from different rows of mirrors on DMD 12 at different times. The desired amount of exposure time can be accomplished by pulsing light source 14 or by leaving light source 14 on and switching the mirrors on or off at the appropriate times. In one example, the "on" or "off" state of the mirrors or the amplitude of light source 14 is updated once for every line of drum movement (each line period). However, many other update speeds may be used without departing from the scope of the invention.

As shown in FIG. 1, pixel 20 is exposed by a column of four mirrors 22–28 during four different time intervals as drum 16 rotates. Each time interval is a "line period". Likewise, pixel 46 is exposed by mirrors 38–44. Pixel 21, which is in the second row of pixels, is exposed by mirrors 22–28 but one line period later than pixel 20. Thus, each pixel of drum 16 is exposed in accordance with data delivered to four different mirrors in the same column of DMD 12 during four successive line periods.

U.S. patent application Ser. No. 08/038,398, entitled "Process and Architecture for Digital Micromirror Printer", herein incorporated by reference, describes methods of generating gray scales, but without the sliding window implementation of the present invention. Generating a particular shade of gray at a pixel on the image involves the following steps. First, light is reflected onto the pixel (which may be divided into smaller "phases") and accumulated through time integration. This light discharges (or charges) the drum at the pixel and creates a three-dimensional voltage profile. The relationship between the light exposure and the voltage is non-linear, and the non-linear curve is called the Photo-Induced Discharge curve ("PIDC"). A development potential is applied to the drum and the toner particles are brought into contact. The mass of toner attracted to the pixel has a non-linear relationship to the voltage. The toner is then fused to the paper by applying heat. The mass of toner fused determines the gray scale.

The relationship between the light exposure on the drum and the final gray scale is not necessarily linear, and can be determined experimentally or through modeling. The relationship can be expressed as a lookup table that relates gray scale to the light exposure needed on each phase. Through the following description, use of the term "grayscale" will refer to the cumulative light exposure at a pixel, rather than the actual perceived grayscale. Due to the non-linear relationship described above, it is possible that two different exposure profiles may result in the same that ale, and alternatively that two different profiles with the same cumulative exposure may result in different perceived grayscales.

It should be understood that the mirrors shown in FIG. 1 are exemplary only, and that other shaped mirrors may be used as well. In particular, the mirrors shown in FIG. 1 are square, and are referred to as isomorphic DMDs. Anamorphic DMDs may also be used. For example, rectangular DMDs having half the height of those shown in array 12 may also be used. Furthermore, the optics 18 may be used to make isomorphic mirrors effectively anamorphic, and vice versa.

Figure 2:
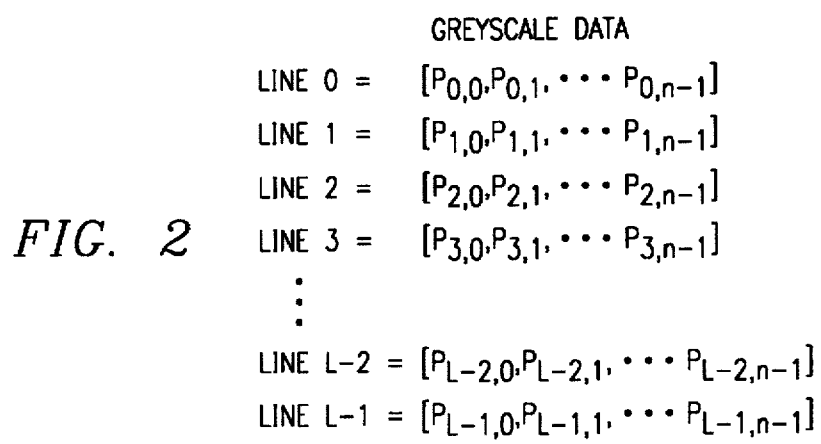
FIG. 2 illustrates an array of contone data to be printed on a page.

FIG. 2 illustrates a set of greyscale values, representing an image to be printed. A number of lines are to be printed, designated as $Line_0$ through $Line_{L-1}$. Each row of values corresponds to a line, and contains the greyscale data for each pixel on the line. In the example shown, each line includes n pixels. For example, the first row of the array of FIG. 2, $Line_0$, contains data for pixel $P_{0,0}$ through $P_{0,n-1}$. As explained below, these greyscale values are stored in memory 13 and used as the basis for microimage data for delivery to DMD 12. The microimages are time-integrated to result in the desired grayscale image.

Row Integration with a Single Light Intensity

Figures 3, 4, 5, 6:
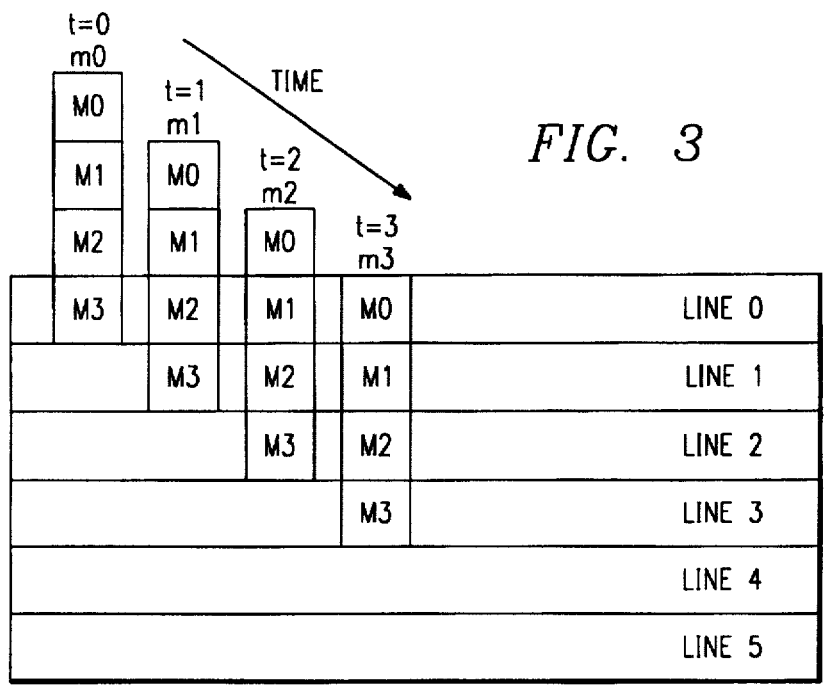
FIG. 3 is a graphical representation, in time, of the relationship between lines on an OPC drum and a DMD array.
FIG. 4 is a row integration sliding window array according to the teachings of the present invention.
FIG. 5 is a row integration gray scale lookup table according to the teachings of the present invention.
FIG. 6 is a microimage array according to the teachings of the present invention.

FIG. 3 illustrates a method of successively exposing each pixel of the image by light from mirror elements in the same column of DMD 12. For example, a line of pixels will first be exposed by a first row of mirror elements, then exposed by a second row of mirror elements, followed by exposures from two succeeding rows of mirror elements. This accumulates exposure on particular pixels, thus allowing for the printing of different gray scales.

In the example of this description, each pixel is exposed by 4 mirrors. More specifically, a particular pixel on image $Line_0$ is exposed first by mirror $M_3$, then by mirror $M_2$, then by mirror $M_1$, then by mirror $M_0$. These exposures occur at times t=0 through t=3, respectively. Although in reality, the exposures are in the same place, for purposes of illustration in FIG. 3, the exposures are spread horizontally. The mirrors M0–M3 might be any column of four mirrors on DMD 12, such as mirrors 22, 24, 26, and 28 of FIG. 1.

At the beginning of each new exposure period, the DMD 12 is addressed with a new set of data. The data delivered to each mirror is binary in the sense that it indicates whether that mirror should be ON or OFF during that exposure period. The binary data (0 or 1 values) for all mirrors of DMD to be addressed during a single exposure period is referred to herein as "microimage" data. In the example of FIG. 3, four microimages, $m_0$–$m_3$, are superposed to represent the final image.

Although FIG. 3 illustrates the complete exposure of only one pixel (on Line 0), all other pixels are exposed in the same manner. Pixels in the same column are exposed by the same mirror elements, but with other microimage values. Pixels in different columns are exposed by different mirror elements.

The microimages can be visualized as moving down the "page" represented by pixels on drum 16. In the example shown, DMD 12 moves down the page one line at a time. At each new position, DMD 12 receives new data and generates a new microimage. At each new position, all but the top one of the previously exposed lines of the image are part of the new microimage. A new line of the image is also part of the new microimage.

The present invention involves the retrieval of data from memory 13 for providing the microimage data to DMD 12. The memory 13 uses pointers to simulate a sliding window, which at any given time contains the greyscale data from which the current microimage is derived. The pointers are reassigned so that the sliding window slides down the page. At each new position of the sliding window, each pixel's greyscale value is updated to account for the previous microimage exposure of that pixel's total exposure.

FIG. 4 illustrates a sliding window array for a row integration system. This array is stored in memory 13. As shown in FIG. 4, the sliding window array has R rows, designated $ROW_0$ through $ROW_{R-1}$. The array contains an exposure value for each pixel to be exposed. The number of rows in the sliding window corresponds to the number of rows of the microimages generated by DMD 12.

FIG. 5 illustrates a look-up table for obtaining the exposure values in the sliding window array of FIG. 4. The lookup table maps a desired grayscale into exposure values to be stored in the sliding window array. Each exposure value is the number of exposures that a pixel is to receive. Thus, the number of sliding window array rows must be at least as great as the highest number of exposures in the lookup table. For example, the lookup table of FIG. 5 has 9 as the highest exposure value, and thus at least 9 sliding window array rows are needed.

In operation, the sliding window array is initialized with all zeros. The exposure values for the first line of the image are then addressed as the last row of the array. In this description, the array rows are identified with pointers, so that no actual copying of data from one location from another is required. Of course, the invention could also be implemented with copying, such that data is written into appropriate locations in memory.

FIG. 6 illustrates how microimage data is obtained from the exposure values of FIG. 4. For the first microimage, all of the mirrors of DMD 12 are OFF except the appropriate mirrors in the last row of DMD 12. This last row will expose the first line of the image during the first exposure period. The mirrors of DMD $ROW_{R-1}$ will be ON or OFF, depending on the information in $ROW_{R-1}$ of the sliding window array. As illustrated, if the exposure value for a mirror is $\geq 1$, the mirror is ON. If the exposure value is 0, the mirror is OFF.

FIG. 7 illustrates the sliding window array of FIG. 4, but after the first exposure. The exposure values of $ROW_{R-1}$ have been decremented to reflect the first exposure. $ROW_{R-1}$ has been readdressed as $ROW_{R-2}$. Furthermore, a new row of exposure values is addressed as $ROW_{R-1}$, for the second line of the image, which is Line 1 of FIG. 2.

The process of obtaining a microimage from the sliding window values, then updating the sliding window continues until all the exposure values from FIG. 2 have been used to generate microimages, and thus to generate the page to be printed.

General Approach for Sliding Window Array

FIG. 8 illustrates a generalized process for using a sliding window array of exposure values in accordance with the invention. It describes the process described above in connection with FIGS. 3–7 for row integration, as well as the processes described below for other types of greyscale printing.

Step 80 is initializing the sliding window array with 0s. In step 82, the sliding window array is addressed for the first microimage. In other words, during the first exposure period, which begins at time t=0, row $ROW_{R-1}$ is loaded with exposure values. All other rows of the sliding window array remain initialized at zero.

In step 84, a microimage is generated based on the exposure values in the sliding window array. After generating the microimage, which includes loading the microimage data into DMD 12 and exposing drum 16, in step 86, the sliding window array is decremented. Decrementing is accomplished by subtracting one unit from each exposure value in the sliding window array that corresponds to a pixel that has been exposed.

After decrementing the sliding window array, exposure values will be readdressed to the sliding window so that the sliding window corresponds to the new position of drum 16. Thus, the process loops back to step 82. Rows of exposure values receive addresses for preceding rows of the array, such that each row receives exposure values from the next row down. Expressed as a formula, $ROW_K = ROW_{K+1}$. The top row of exposure values, which should by now by decremented to 0 drops out of the sliding window. A new row of exposure values for the next line to be printed is addressed as the last row of the sliding array. Thus, $ROW_{R-1} = Line_r$. This process continues until all lines of the image have been exposed.

Multiple Intensity System

Figures 9, 11:
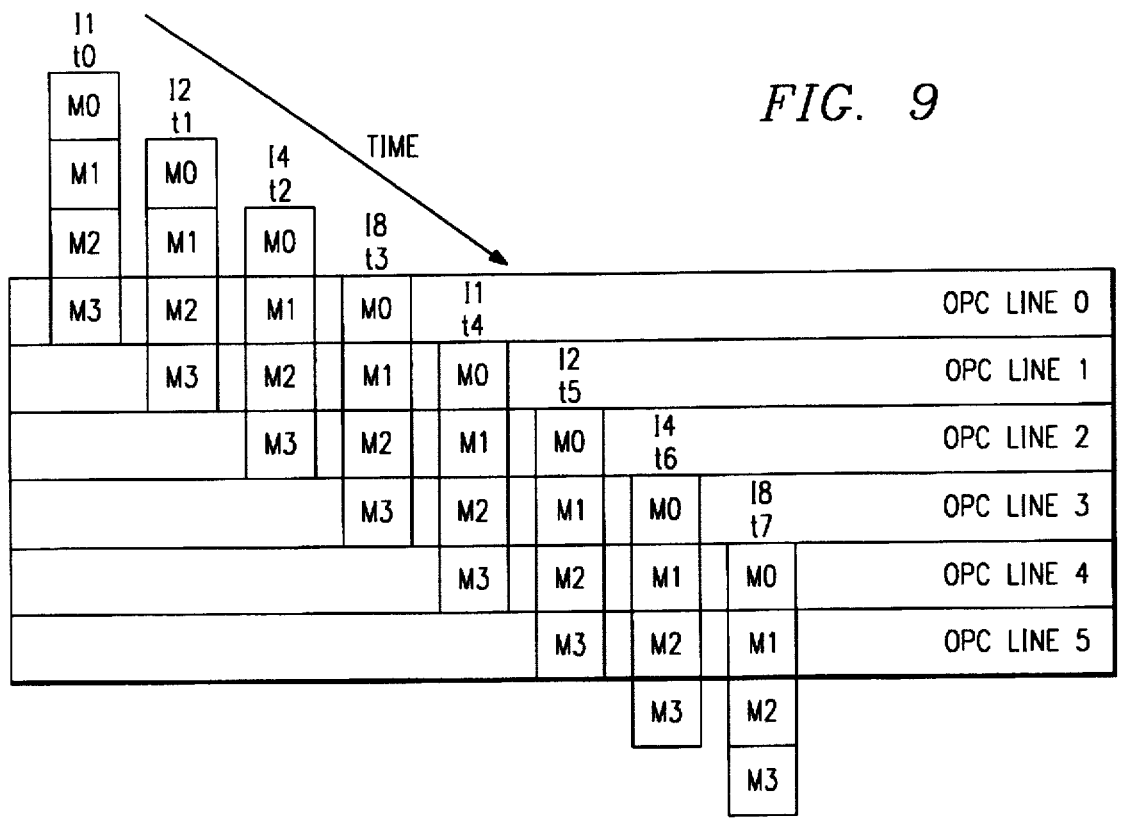
FIG. 9 is a graphical representation, in time, of the relationship between lines on an OPC drum and a DMD array.
FIG. 11 is a lookup table for gray scale using four light intensities according to the teachings of the present invention.

FIG. 9 illustrates a multiple intensity approach to grayscale printing. Like FIG. 3, FIG. 9 illustrates exposure of several pixels in one column of an OPC drum. For purposes of illustration, the exposures are spread horizontally, but are actually superposed. In the approach of FIG. 9, the intensity of light source 14 of FIG. 1 is cycled through different intensities. In particular, the representation of FIG. 9 illustrates four different intensities, $I_1, I_2, I_4, I_8$, where the second intensity is twice the first, the third intensity is twice the second, and the fourth intensity is twice the third. It should be understood that the particular intensities are exemplary only, and other intensities may be used as well. With four intensity levels, and four mirrors used to expose each pixel, 16 grayscale levels (0 through 15, where 8+4+2+1=15), are available.

FIG. 10 illustrates the sliding window array for the multiple intensities approach of FIG. 9. Each row of the sliding window array includes exposure data for each intensity for each pixel on that row. Thus, each row is a two-dimensional array in itself, having p columns, where p is the number of pixels in a row, and i rows, where i is the number of different intensity levels available in the system.

The exposure data for each intensity corresponds to the number of exposures that each pixel should receive at a particular intensity level. This information is received from a lookup table such as that shown in FIG. 11. The lookup table of FIG. 11 maps the desired grayscale from the data of FIG. 2 into the number of exposures required at each intensity level. For example, the sliding window array of FIG. 10 shows pixel $P_0$ of $ROW_{R-1}$ having a grayscale level of 2, pixel $P_1$ having a grayscale value of 31, and pixel $P_{p-1}$ having a grayscale value of 63.

As discussed above in connection with FIG. 8, for each exposure period, a microimage is generated based on the sliding window array of FIG. 10, followed by decrementing and sliding the sliding window array. In the multiple intensities approach, decrementing is accomplished by subtracting one from the exposure value for the appropriate intensity of each pixel that has a value greater than zero. In the example of FIG. 10, after the first exposure at intensity $I_1$, the $I_1$ data value for pixel $P_0$ of $ROW_{R-1}$ will not be decremented, because it is zero. For pixel $P_1$ of the same row, the $I_1$ data value is decremented from the three to two, and for pixel $P_{p-1}$, the data value $I_1$ is decremented from five to four.

Pulse Positioning

FIG. 12 illustrates a pulse position approach to grayscale printing. Like FIGS. 3 and 9, FIG. 12 illustrates the relationship between a column of pixels of several lines on drum 16 and mirrors in a column of DMD 12. Pulse positioning is used to control where light from each of the mirrors falls on the drum.

In the example of FIG. 12, the "on" time for every other microimage is alternatively delayed or advanced by ¼ pixel height. The mirror that overlaps line L and line L+1 is counted as contributing to Line L. Thus, a pixel on Line 0 is exposed by mirror M3 at time t=0 with intensity I1 at phase P1, by mirror M2 at time t=1 with intensity I2 at phase P2, and so on.

Thus, a particular pixel has two phases. These phases can be created by controlling when the light is reflected onto the OPC drum. This control can be performed by pulsing the light source at the desired times, or by using the mirrors to switch light onto the drum only at the appropriate times. Since the drum is always rotating, controlling the time at which light is reflected controls the position at which the light falls on logical pixels. Thus, the technique is referred to as pulse positioning.

Pulse positioning may be combined with changing of the light intensity, although this is not required. By changing the light intensity, greater numbers of different exposure profiles can be created, therefore allowing for a greater number of gray scales to be printed.

FIG. 13 illustrates a sliding window array for a system using multiple phases and intensities. Each row of this sliding window array includes intensity data for each phase of the pixel. Thus, for a pixel having two phases, and using two intensities, each element of the array will have four exposure values. These four values are the number of exposures required for a given pixel's first phase at the first and second intensity levels, and that pixel's second phase at the first and second intensity levels.

Figures 14, 15:
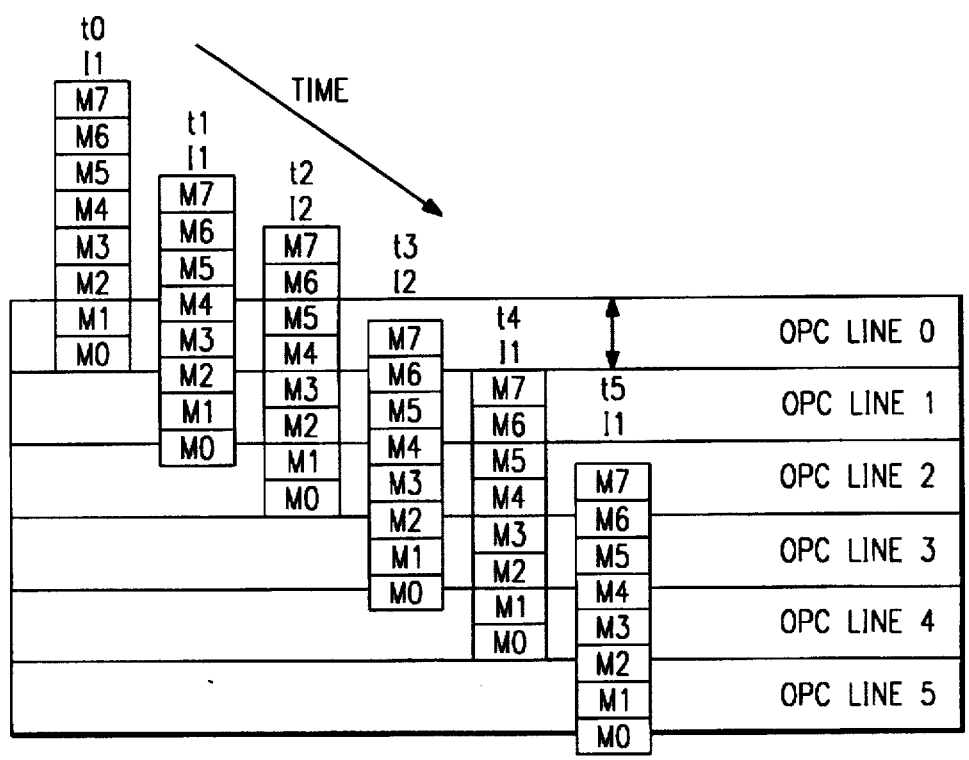
FIG. 14 is a gray scale lookup table with two phases and two intensities according to the teachings of the present invention.
FIG. 15 is a graphical representation, in time, of the relationship between lines on an OPC drum and a DMD array.

FIG. 14 illustrates a lookup table that is used to map the greyscale of FIG. 2 to the sliding window array of FIG. 13. As shown in FIG. 14, a desired gray scale maps into a number of exposures for each phase at each intensity. With mirrors that result in an exposure that is the height of one line, the number of DMD rows equals the number of sliding window array rows. This number equals the number of intensities times the maximum number of exposures in the lookup table.

It should be understood that the number of intensity levels and the number of phases shown in FIGS. 12, 13, and 14 is exemplary only, and more or fewer intensities and phases may be used without departing from the invention.

FIG. 15 illustrates another example of multiple intensities and multiple phases. As shown in FIG. 15, anamorphic mirrors (or optics) are used, such that light exposes areas that are not square. In the example of FIG. 15, these areas are rectangular, and four phases correspond to each pixel. With anamorphic optics as shown in FIG. 15, two phases are independently exposed by two mirrors at the same time.

Thus, for each microimage, data for two phases in the sliding window array will be decremented.

With the greyscale method of FIG. 15, a sliding window array similar to that shown in FIG. 13 is used, with the exception that each pixel has data for four phases and two intensities rather than for two phases and two intensities. FIG. 16 illustrates a lookup table that may be used to map a desired grayscale level from the array of FIG. 2 to a sliding window array.

The example of FIG. 15, with anamorphic optics, multiple intensities, and overlapping phases, is exemplary only. It should be understood that many other combinations are possible. For example, anamorphic optics could be used without overlapping phases and with multiple intensities. In a situation where the anamorphic optics results in two mirrors per pixel, and using two intensities, the sliding window array would look the same as that shown in FIG. 13.

Pulse Duration

Another greyscale printing method is known as pulse duration modulation ("PDM"). With pulse duration modulation, the duration of a pulse is controlled, either by pulsing the light or by switching the mirrors, such that the exposure level is adjusted by controlling the length of time that the light shines on the OPC drum.

FIG. 17 illustrates a sliding window array for pulse duration modulation. The example of FIG. 17 has three different pulse durations, each having a different delay. The graphical representation of the relationship between the mirrors and the lines on the page is similar to that shown in FIG. 9, with the intensity modulation being replaced by pulse duration modulation.

FIG. 18 illustrates a lookup table that is used to map the greyscale data from the array of FIG. 2 into the sliding window array of FIG. 17. As shown in FIG. 17, pixel $P_0$ of $ROW_{R-1}$ corresponds to a gray scale of 15, pixel $P_1$ corresponds to a gray scale of 30, and pixel $P_{p-1}$ corresponds to a gray scale of 31. For an isomorphic system, exemplary durations are 2.5%, 5%, and 10% for $D_1$, $D_2$, and $D_3$, respectively. These percent durations are expressed in terms of the percentage of the line period, where the line period is the amount of time for one row of pixels to rotate one row.

With pulse duration modulation, it is desirable in certain applications to delay the shorter duration pulses, to align the centers of each area of exposure. This is true because the drum 16 rotates while pixels are being exposed, and thus the center of each exposure area depends on its duration.

Figures 19, 20, 21:
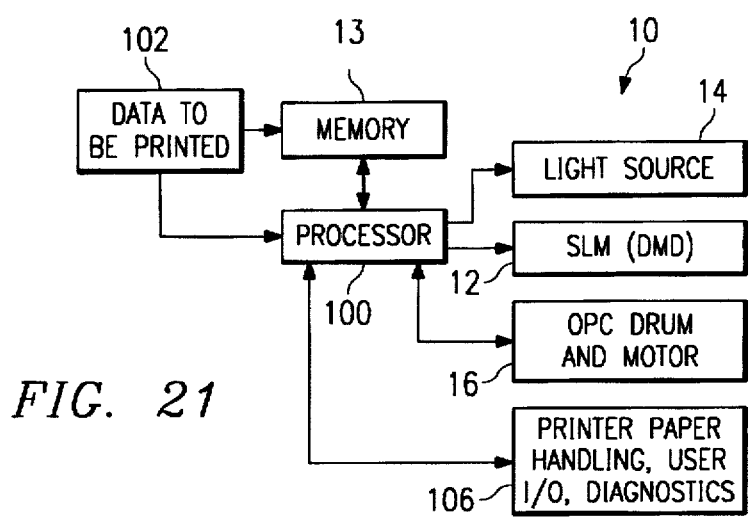
FIG. 19 is a gray scale lookup table for an anamorphic two duration pulse duration modulation system according to the teachings of the present invention.
FIG. 20 is an alternative embodiment gray scale lookup table for a two intensity four phase system according to the teachings of the present invention.
FIG. 21 is a block diagram of a printer according to the teachings of the present invention.

Pulse duration modulation may be used with both isomorphic and anamorphic systems. FIG. 19 illustrates a lookup table that is used to map greyscale data from the array of FIG. 2 into a sliding window array for an anamorphic system (similar to that of FIG. 15) using pulse duration modulation. Phases $P_1$ and $P_3$ are created by two adjacent mirrors of a column, and phases $P_2$ and $P_4$ are created by two other adjacent mirrors of the column. The appropriate duration times are shown in FIG. 19 as 25% for phases $P_1$ and $P_3$ and 12.5% for phases $P_2$ and $P_4$. Furthermore, phases $P_2$ and $P_4$ are delayed 6.25% to align their exposure centers with that of $P_1$ and $P_3$.

Alternative Lookup Table

As discussed above, the various lookup tables map the contone (gray scale) data from the array of FIG. 2 to the appropriate sliding window array. The data that is entered into the sliding window array corresponds to the number of exposures for a particular pixel or phase at a particular intensity. However, data other than this type of "number of exposure" data can also be included in these lookup tables and sliding window arrays.

FIG. 20 illustrates a lookup table in which exposure information is represented as a single number for all phases, rather than as separate numbers for each intensity level. This single number represents the desired exposure expressed in units of the lowest intensity for each phase. For example, with a system using four intensity levels, 1, 2, 4, and 8, times some base intensity level, a desired intensity level of 15 can be represented by one exposure at intensity level 8, one exposure at intensity level 4, one exposure at intensity level 2, and one exposure at intensity level 1, as in FIG. 11. With the lookup table of FIG. 20, however, an exposure intensity of 15 would be entered as a single data point of 15. This reduces the amount of memory required for the sliding window array, since only these single data points will be entered for each element in the array.

With such a lookup table, one decrementing strategy is as follows. First, the sum of the intensities in the repeat cycles is computed. In the example where the intensities cycle from 1 to 2 to 4 to 8, the sum is 15. If the current desired exposure from a sliding window array is greater than that sum, then the corresponding mirror is set to ON for the current intensity level, and the sliding window array entry for that pixel is then decremented by the current intensity. This continues until the desired exposure of a particular pixel is less than the sum of the intensities in the repeat cycle. Once this occurs, the binary representation of the desired exposure is logically ANDed with the current intensity. If the result is a one, then the corresponding mirror is switched on and the appropriate entry in the sliding window is decremented.

Control System

FIG. 21 illustrates a block diagram of the circuitry that controls printer 10. As shown in FIG. 21, a processor 100 receives data representing the image to be printed from data source 102 either directly or through memory 104. Source 102 may represent any device that can output data to be printed, such as a personal computer. The memory 13 is used to store data to be printed and to store other data, such as preprogrammed data for later printing. A processor 100 includes instructions for controlling its operation. Processor 100 is coupled to memory 13, light source 14, DMD 12, and OPC drum and motor 16. Processor 100 is also coupled to printer paper handling, and user I/O, and diagnostics block 106.

In operation, processor 100 processes the data to be printed by controlling light source 14 and array 12. For example, processor 100 will determine the gray scale that must be written for a particular pixel, and control the particular mirrors of array 12 and light source 14 to accomplish that intensity at the pixel.

The memory 13 includes sliding window arrays such as those discussed above. Thus, processor 100 will control the DMD array 12 and light source 14 according to the sliding window array. After each exposure, processor 100 will decrement the sliding window array in memory 13 as discussed above. In this manner, memory requirements are greatly reduced. In particular, gray scale information can be maintained in as few as three memory blocks. The first memory block will include the contone data to be printed on a page, as represented by the array of FIG. 2. This data may be received from block 102 of FIG. 21. The second memory block will include a lookup table as discussed above. The third block will include the sliding window array. Processor 100 will execute instructions to carry out the flow diagram of FIG. 8, accessing these memory blocks from memory 13.

Defect Compensation

The invention provides for a simple method for compensating defects in DMD 12. Three types of defects are black defects (where certain mirrors are stuck in the OFF position), white defects (where certain mirrors are stuck in the ON position), and non-uniformity (some mirrors resulting in greater exposure than other mirrors).

Black defects are handled by simply not decrementing a pixel's exposure value when the defective mirror is encountered. The microimage value for that mirror is set to off.

White defects may be handled by creating a constant background to eliminate their effect. First, the maximum exposure that will result from the white defects in the column with the most number of white defects is determined. This exposure level is then used as a background exposure level, which is added to the exposure value for each pixel or pixel phase of the image. During the print process, the background exposure is eliminated by choosing an appropriate development threshold. With the addition of the background, the effect of white defects may be subtracted during exposure either by pre-subtraction or by decrementing. As an example of pre-subtraction, if the background level is 8, and a pixel has a greyscale value that maps to a desired exposure of 20, then this exposure is incremented to 20+8=28. If one or more white defects affect this pixel with intensity 4, then 4 is subtracted from the desired exposure to result in a net exposure of 28-4=24, which is the value stored in the sliding window array. Then, the sliding window method described above is used, such that a pixel's exposure value in the sliding window array is not decremented when the defective mirror is encountered. Alternatively, instead of pre-subtraction, a pixel's exposure value in the sliding window array is "force-decremented" when the defective pixel is encountered.

Another approach to white defect compensation is referred to herein as "white balancing", where extra white defects are simulated in a separate region of DMD 12 so as to equalize the effect of white defects. For n(b) or fewer black defects in each column, an extra n(b) rows used to compensate for missed exposures. For n(w) or fewer white defects in each column, an extra n(w) rows are added to compensate for missed exposures. Also, an extra n(w) rows are used for white balancing to equalize the effect of white defects. For columns of SLM 12 in which there are white defects, the same number of pixels in the corresponding column of the white balancing area are "off". If there are insufficient mirrors in the corresponding column to compensate for the defective pixel-generating elements of SLM 12, all mirrors of that column are "off". All other mirrors in the white balancing area are "on". This results in a constant background which can be eliminated from the print by choosing the appropriate development threshold.

The sliding window process described above can be modified to incorporate correction for non-uniformity in the SLM 12. There are two types of non-uniformity: one dimensional, where uniformity varies across the SLM in the cross-process direction, and two dimensional, where uniformity varies from mirror to mirror. The former usually results from illumination falloff and the latter from a combination of illumination falloff and mirror-to-mirror reflectance variations.

For both cases of non-uniformity, the same approach can be used. When decrementing the exposure value in the sliding window array, decrement by an effective exposure value, which is the product of the actual reflectance at the mirror times the intensity of the exposure. In the one-dimensional case, this can be simplified such that if a particular column is only 90% efficient as compared to some standard, then the desired exposure for any pixel in the column is multiplied by 10/9 before it is stored in the sliding window array. This multiplication factor is also applied to any white defect background exposure level that is added to the desired exposure. With these pre-corrected exposure levels, the decrementing strategy is as described above, by the current exposure. The advantage of this approach is that all adjustments are done to the exposure before storing it in the sliding window array. This requires less processing than having to perform adjustments during the sliding window process.

Other Embodiments

Throughout this discussion, various specific examples have been provided. However, the present invention is not limited to these examples, which have been provided to explain the invention, and how to make and use it. Thus, different sized sliding window arrays, containing different information, and different lookup tables are within the scope of the present invention. These arrays and tables will vary depending upon the control technique used, whether it be any one of those discussed above, variations or combinations of these, or others not listed herein. For example, systems with staggered arrays, as discussed above, may be used, and the sliding window arrays for such systems would include exposure information for every phase of a logical pixel, and the lookup tables would include columns for every phase.

Although the present invention has been described in detail, it should be understood that various changes, substitutions and alterations can be made without departing from the spirit and scope of the invention as defined by the appended claims.

What is claimed is:

1. A method of compensating for defective elements of a spatial light modulator (SLM) used for exposing a photoconductive printer drum, which elements are "stuck on", comprising the steps of:

providing extra rows of said SLM, which extra rows comprise a white balancing area;

determining a number of said defective pixel-generating elements in each column of said SLM;

for each said defective element in a column of said SLM, addressing elements in a corresponding column of said white balancing area as "off"; and addressing all other elements in said white balancing area as "on".

2. A method of compensating for non-uniform illumination by elements of a spatial light modulator (SLM) used for exposing a photoconductive drum to generate a greyscale image, comprising the steps of:

determining an efficiency factor for each column of said SLM; and multiplying exposure values for each said pixel-generating element in a column of said SLM by the efficiency factor for that column, wherein said exposure values represent the number of times each pixel of said image is to be exposed.

* * * * *